(12) United States Patent
Plautz et al.

(10) Patent No.: US 9,207,315 B1
(45) Date of Patent: Dec. 8, 2015

(54) METAL DETECTOR WITH MOTION SENSING

(75) Inventors: John W. Plautz, Junction City, OR (US); Kelly M. Plautz, legal representative, Junction City, OR (US); Anne E. Kelley, Corvallis, OR (US); Jeffrey L. Kelley, Corvallis, OR (US); Carl W. Moreland, Corvallis, OR (US)

(73) Assignee: White's Electronics, Inc., Sweet Home, OR (US)

( * ) Notice: Subject to any disclaimer, the term of this patent is extended or adjusted under 35 U.S.C. 154(b) by 551 days.

(21) Appl. No.: 13/169,427

(22) Filed: Jun. 27, 2011

Related U.S. Application Data

(60) Provisional application No. 61/398,475, filed on Jun. 25, 2010.

(51) Int. Cl.
| | |
|---|---|
| *G08B 21/00* | (2006.01) |
| *G08B 13/24* | (2006.01) |
| *G08B 13/26* | (2006.01) |
| *G01V 3/08* | (2006.01) |
| *G01V 3/10* | (2006.01) |
| *G01S 13/88* | (2006.01) |

(52) U.S. Cl.
CPC ............ *G01S 13/885* (2013.01); *G01S 13/887* (2013.01); *G01V 3/10* (2013.01); *G01V 3/101* (2013.01)

(58) Field of Classification Search
CPC ................................. G08B 13/08; G01V 3/15
USPC ............... 340/686.1, 551, 561; 324/326–329; 326/329
See application file for complete search history.

(56) References Cited

U.S. PATENT DOCUMENTS

| | | | | |
|---|---|---|---|---|
| 6,911,823 | B2 * | 6/2005 | Rowan | 324/326 |
| 7,038,584 | B2 * | 5/2006 | Carter | 340/539.13 |
| 7,518,374 | B1 * | 4/2009 | Olsson et al. | 324/326 |
| 7,532,127 | B2 * | 5/2009 | Holman et al. | 340/686.1 |
| 7,731,602 | B2 * | 6/2010 | Cage | 473/324 |
| 2001/0028301 | A1 * | 10/2001 | Geiger et al. | 340/5.91 |
| 2008/0134102 | A1 * | 6/2008 | Movold et al. | 715/863 |

* cited by examiner

*Primary Examiner* — Fekadeselassie Girma
*Assistant Examiner* — Mohamed Barakat
(74) *Attorney, Agent, or Firm* — James Creighton Wray

(57) ABSTRACT

A metal detector has a motion sensor such as an accelerometer to determine direction, speed, duration and acceleration of search loop motion. The search loop motion information from the motion sensor is utilized in mode selection, signal processing, target analysis, and information display.

24 Claims, 2 Drawing Sheets

METAL DETECTOR WITH MOTION SENSING

This application claims the benefit of U.S. Provisional Application No. 61/398,475, filed on Jun. 25, 2010, which is hereby incorporated herein by reference in its entirety.

FIELD OF THE INVENTION

This invention relates to metal detectors.

BACKGROUND OF THE INVENTION

Handheld metal detectors typically have a search loop that is swept over ground to look for buried targets. Often the ground includes mineralization which creates a response in the detector. Some metal detectors include electronic filters which can distinguish between slowly varying mineralization (ground) signals and fast-response target signals. Optimum filter design depends on how fast the user sweeps the search coil, as this determines the speed of the target response. In the past, some metal detectors have had filters designed for a slow optimum sweep speed, while other detectors required a fast sweep speed.

Modern metal detectors also utilize analog and digital signal processing which further separate desirable target responses from undesirable ground responses using techniques commonly called ground balance and ground tracking. Additional signal processing is used to distinguish different types of targets, a technique known as discrimination. Both ground tracking and discrimination are susceptible to sweep speed. That is, both can be optimized if the sweep speed of the search loop is known. Other methods of signal processing can be triggered if certain loop motion occurs. For example, manual ground balance can be affected by "bobbing" the loop up and down, and target averaging can be applied when short, quick sweeps are used over the target.

Many detectors include either visual or tonal identification, or both. Visual identification can include a number of methods of displaying target response, some of which depend on the sweep speed of the loop, or knowing the direction of the loop sweep, or knowing the endpoints of the search sweep, that is, the points where the loop stops and reverses direction. Tonal responses can also be altered under different sweep situations, resulting in more varied or more accurate audio information.

In current metal detector designs, there are often provisions for changing filter parameters, search modes, ground tracking responses, signal processing methods, and visual display techniques, but these usually require manual intervention by the user and sometimes advanced knowledge of how the technology works, leading to user errors in setting up the detector.

Needs exist for improved metal detectors.

SUMMARY OF THE INVENTION

A metal detector of the present invention includes a search loop, signal processing circuitry, and a method of sensing the motion of the search loop. A preferable method is to detect the physical loop motion and use that information to automatically set operating parameters to optimum levels. A motion sensor in the metal detector has an accelerometer of one or more axes, other mechanical means, optical means, or other electronic means.

The motion sensor is placed in the search loop, or is attached to the search loop of the metal detector, or is placed elsewhere in or on the metal detector or in a combination of places therein or thereon. The motion sensing elements in the metal detector are connected to the main signal processing circuitry, either directly or via intermediate circuitry. The motion sensor or motion sensor circuitry communicates with the main signal processing circuitry either via wired or wireless methods. The motion sensor or motion sensor circuitry communicates with the main signal processing circuitry either via analog signals or digital signals, either autonomously, or provides motion information on request.

The new metal detector with the motion sensor includes the ability to detect one or more of horizontal search loop motion,
   the speed of horizontal search loop motion,
   the duration of horizontal search loop motion,
   the direction of horizontal search loop motion,
   the end points of horizontal search loop motion,
   abrupt horizontal search loop motion changes,
   vertical search loop motion,
   the speed of vertical search loop motion,
   the duration of vertical search loop motion,
   the direction of vertical search loop motion,
   the end points of vertical search loop motion,
   abrupt vertical search loop motion changes, and
   position and changes of position of the search loop on the Earth's surface.

A new method of operating a metal detector includes providing a search loop, a main signal processing circuitry, and a method of sensing the motion of the search loop. The motion sensor provides real-time information on the motion of the search loop, including one or more of:
   horizontal search loop motion,
   speed of the horizontal search loop motion,
   duration of the horizontal search loop motion,
   direction of the horizontal search loop motion,
   end points of the horizontal search loop motion,
   abrupt horizontal search loop motion changes,
   vertical search loop motion,
   speed of the vertical search loop motion
   duration of the vertical search loop motion,
   direction of the vertical search loop motion,
   the end points of vertical search loop motion,
   abrupt vertical search loop motion changes.
   position of the search loop on the Earth's surface, and changes in position.

The ability to alter detector operating parameters depending on loop motion include but is not limited to the ability to alter transmit waveforms, filter methods, recovery speed, and self-adjusting threshold.

The invention provides the ability to use loop motions for the purpose of signal analysis, including but not limited to filtering, sampling, averaging, target depth calculation, target data normalizing, target data averaging, and the rate of target phase change.

The new system includes the ability to alter the type of data presentation, including visual or audible, depending on loop motion and includes the ability to adjust the method of data presentation, either visual or audible, depending on loop motion.

The new system has the ability to adjust the rate of data presentation, either visual or audible, depending on loop motion and the ability to alter target data and data analysis to compensate for loop direction.

The new motion detector provides the ability to alter data analysis to compensate for loop direction and to alter data presentation to compensate for loop direction.

Altering data presentation includes the use of end point detection for the purpose of signal display or analysis, including but not limited to performing and presenting sweep profile analysis.

The invention detects unwanted loop motion in an otherwise stationary metal detector and includes the ability to suppress error signals.

The new method includes the use of vertical loop motion detection to initiate ground balancing to restrict ground balancing and to use vertical loop motion in the processing of ground signals.

The new motion sensor provides for vertical loop motion to initiate fast automatic ground tracking and the use of various loop motions to alert the user of improper loop sweep methods.

The new motion sensor in the search loop provides the suggestion of altering operating parameters, provides feedback or training on proper sweep methods, and includes the ability to detect the lack of certain types of motion over a period of time, including the automatic shutdown or interruption of the detector to save power when not in active use.

Search loop motion data is combined with detection data and adjusts the rate of detection data capture depending on loop speed.

The invention provides the ability to determine and record distances along with detection data, with or without the use of GPS, using loop motion data.

Search loop motion data, position data and detection data are used for the purpose of active mapping or for post-process mapping of a search area.

These and further and other objects and features of the invention are apparent in the disclosure, which includes the above and ongoing written specification, with the claims and the drawings.

DETAILED DESCRIPTION OF THE INVENTION

Figure 1:
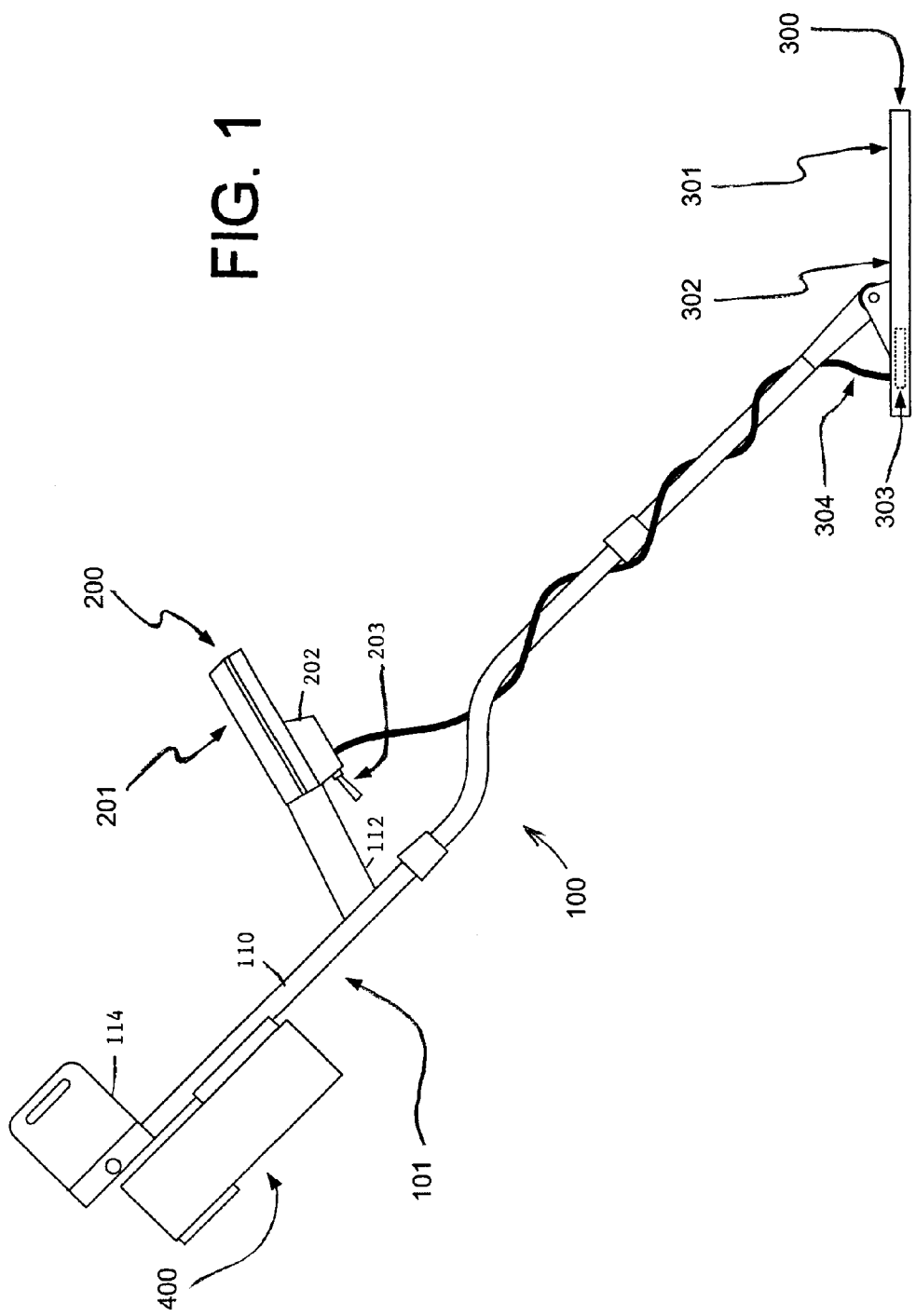
FIG. 1 depicts a handheld metal detector, including a motion sensor.
Figure 2:
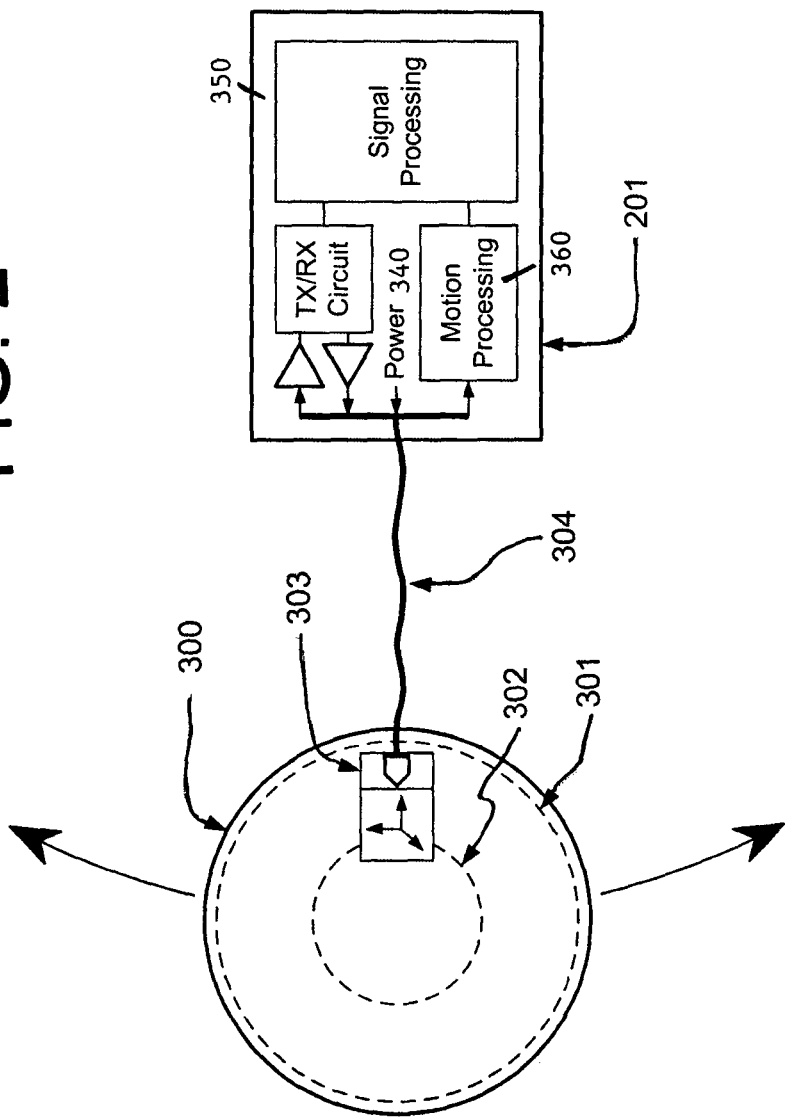
FIG. 2 shows a search loop including a motion sensor, and processing diagram.

FIGS. 1 and 2 depict a handheld metal detector 100 with a bent shaft 110, a hand grip 112 and an open-front, U-shaped lower arm stabilizing support 114, a main control unit 200, search loop 300, and battery box 400. Control unit 200 typically includes processing electronics 201, user interface 202, and trigger switch 203. Search loop 300 includes a transmit coil 301, receive coil 302, and motion sensor circuit 303 which includes a motion sensor in accordance with this invention. The new motion sensor is preferably a three-axis micro electrical mechanical system (MEMS) accelerometer attached to the search loop or elsewhere on the metal detector to monitor search loop motion in all three axes. Reduced but still useful functionality can be achieved with a one or two axis accelerometer, or with the use of a non-MEMS motion sensor, including optical and mechanical methods.

Instead of placing the motion sensor 303 inside the loop 300, it is possible to place it elsewhere on the detector, such as on the processing electronics case 200. As long as the pivot point of the detector is behind the motion sensor, the motion sensor will experience similar, although reduced forces and distances of motion as the loop is moved.

Some users prefer to use a so-called "hip mount" configuration in which the upper unit 101 is carried separately from the loop.

In this case, a motion sensor mounted in the control unit would not work. In the case of a so-called "pinpoint probe" type metal detector, the search loop and processing electronics are often placed in a single small housing, so the placement of the motion sensor is relatively unimportant.

In the metal detector 100 loop cable 304 connects the search loop 300 to the control unit 200 and includes wiring for the transmit coil 301 and the receive coil 302. See FIG. 2. A motion sensor 303 mounted remotely in the search loop 300 will require both power and a means of communication. Depending on the design of the transmit and receive circuitry, it may be possible to combine one or both of these additional functions with existing wiring. For example, if the transmit coil 301 is referenced off +V and the receive coil 302 is referenced to ground, then these +V and ground connections may be used to power the motion sensor circuitry 303.

Some motion sensors, including micro electrical mechanical systems (MEMS) devices, produce analog signals corresponding to motion, while some motion sensors produce digital signals. To minimize wiring to the search loop, a digital standard such as I2C may be optimal for communications. For an analog sensor, this means that a microcontroller including analog-to-digital converter may be necessary to provide digital communications. Digital communication may be superimposed or interleaved with existing signals and extracted from the existing signals using filtering techniques, or may be provided over additional wiring. Communication may also be facilitated using wireless methods, such as RF or infrared.

In normal detector operation, the signal processing circuitry 350, as shown in FIG. 2, may periodically request motion information from the motion processing circuit 360 and motion sensor 303, or the motion sensor processing circuit 360 may send out motion information automatically at periodic intervals. In either case, the information rate needs to be fast enough to obtain several readings per sweep of the search loop. A typical user sweep speed is roughly one second from one side to the other, so an information rate interval of 100 ms would be sufficient. A faster rate would give more accurate position information at the expense of a higher processing requirement.

Assuming a 3-axis motion sensor 303, information from motion processing circuit 360 may include sweep motion in both side-to-side and forward/backward directions, up/down "bobbing" motion, sweep duration, sudden impact, and other possible motion information. In some cases, motion information may be used to determine operating modes in the signal processing circuit 350 such as switching to ground balance, or switching to an all-metal pinpoint mode. In other cases, motion information is used to optimize operating parameters such as filter selection or target recovery speed. Motion information can also be used to achieve more accurate detection results, such as improved depth calculation. Motion information can affect certain signal processing techniques, such as target averaging during short quick sweeps.

Metal detectors include one or more methods of providing target information to the user, predominantly including audio responses and visual effects such as analog meters, lights, and LCD displays. Motion information can be used in tonal and graphical analysis. For example, sweep speed may be used to determine tonal duration, and impact detection may be used to suppress audible error signals. Sweep direction and end-point detection may be used in graphing sweep analysis data.

Some metal detectors include the ability to save periodic detection data for the purpose of post-detection processing and analysis, and for graphically displaying area survey plots of detection responses. This may be done either in the metal detector itself, or the data may be stored and downloaded to a computer for analysis and display. In some cases, these metal detectors include the ability to capture Global Positioning Satellite (GPS) coordinates to store along with the detection data to assist with mapping the area survey plot. The periodic rate at which the detection data is saved should roughly correspond to equal spacing of ground coverage, every 1 foot for example. But this will depend on the speed at which the user moves the loop, so a motion sensor can assist with adjusting the capture rate to compensate for variations in the loop speed. Furthermore, the motion data can be saved with the detection data and GPS coordinates to provide more accurate positioning.

Finally, a motion sensor may be used to trigger automatic power-down when the detector remains motionless for a period of time.

While the invention has been described with reference to specific embodiments, modifications and variations of the invention may be construction without departing from the scope of the invention, which is defined in the following claims.

We claim:

1. Apparatus comprising a metal detector further comprising:
   a search loop assembly comprising one or more transmit coils and one or more receive coils;
   electronic circuitry communicating with the search loop assembly for detecting buried objects while sweeping the metal detector over ground, and
   a motion sensor connected to the metal detector and communicating with the electronic circuitry and providing movement directions and speeds to the electronic circuitry
   wherein the motion sensor is a one or more axis motion detector,
   wherein the motion information is provided by the one or more axis motion detector, and
   wherein operating parameters are provided, depending on loop motion to alter transmit wave forms from the one or more transmit coils, to alter filter methods, recovery speeds and self-adjusting thresholds which determine transmit signal properties and receive signal processing properties.

2. The apparatus of claim 1, wherein the motion sensor is a three-axis motion detector and information provided by the motion detector is used for the purpose of filtering, sampling and averaging target depth calculation, target data normalizing and rate of target phase change.

3. The apparatus of claim 1, wherein the motion sensor is mounted in the search loop assembly.

4. The apparatus of claim 1, wherein the motion sensor is mounted on the search loop assembly.

5. The apparatus of claim 1, wherein communications between the motion sensor and the electronic circuitry comprises one or more wires and the electronic circuitry alters target data and data analysis to compensate for loop motion and direction.

6. The apparatus of claim 1, wherein communications between the motion sensor and the electronic circuitry comprises a wireless link.

7. A method of sensing the motion of a search loop assembly and providing motion information to an electronic circuitry comprising:
   providing a metal detector comprising:
   a search loop assembly comprising one or more transmit coils and one or more receive coils;
   the electronic circuitry communicating with the search loop assembly,
   wherein said electronic circuitry provides a transmit signal for the one or more transmit coils and provides receive signal processing for the one or more receive coils wherein said electronic circuitry generates target response data in response to detected buried objects while the search loop assembly is swept over ground;
   wherein the motion information is provided by a one or more axis motion detector;
   and wherein operating parameters are provided which determine transmit signal properties and receive signal processing properties, depending on loop motion to alter transmit wave forms from the one or more transmit coils, to alter filter methods, recovery speeds and self-adjusting thresholds.

8. The method of claim 7, wherein the motion information provided comprises one or more of acceleration, speed, duration, direction, abrupt changes, and end points of sweeping movements comprises providing speed, duration, direction and end points of sweeping movements in a horizontal direction and the electronic circuitry alters target data and data analysis to compensate for loop motion and direction.

9. The method of claim 7, wherein the motion information provided comprises one or more of acceleration, speed, duration, direction, abrupt changes, and end points of sweeping movements comprises providing speed, duration, direction and end points of sweeping movements in a vertical direction and information provided by the motion detector is used for the purpose of filtering, sampling and averaging target depth calculation, target data normalizing and rate of target phase change.

10. The method of claim 7, wherein the motion information provided by the motion sensor is used to power down the metal detector.

11. The method of claim 7, wherein the motion information provided by the motion sensor is used to alter the receive signal processing comprising one or more of filtering, sampling, averaging, target depth calculating, target data normalizing, target data averaging, and the rate of target phase change.

12. The method of claim 7, further comprising presenting target response data by audible or visual means.

13. The method of claim 12, wherein the motion information provided by the motion sensor is used to alter the type of target response data.

14. The method of claim 12, wherein the motion information provided by the motion sensor is used to alter the rate at which target response data is presented.

15. The metal detector method of claim 12, wherein the motion information provided by the motion sensor is used to alter the target response data to compensate for loop direction.

16. The method of claim 7, wherein the motion information provided by the motion sensor includes using sweep endpoint detection for performing and presenting sweep profile analysis.

17. The method of claim 7, further comprising providing positional information of the metal detector using an integrated GPS receiver.

18. The method of claim 17, wherein the motion information provided by the motion sensor and the positional information provided by the GPS receiver are combined to accurately determine the position of the search loop assembly.

19. The method of claim 18, including a method of processing positional information along with target data response for the purpose of visually mapping the target data responses.

20. The method of claim 12, wherein the motion information provided by the motion sensor is used to suppress undesired audible or visual outputs.

21. The method of claim 7, whereby the motion information provided by the motion sensor is used to automatically initiate ground balancing.

22. The method of claim 12, wherein the motion information provided by the motion sensor is used to alert the user of improper loop sweep methods.

23. The method of claim 7, further comprising recording target data, and wherein the motion information provided by the motion sensor is used to adjust the rate at which target data is recorded.

24. The method of claim 7, wherein the motion information is provided by a three-axis motion detector.

\* \* \* \* \*